Jan. 12, 1960  R. M. MARCH  2,920,663
POWER-OPERATED BEVEL EDGE CUTTER
Filed May 12, 1958  2 Sheets-Sheet 1

INVENTOR.
RAYMOND M. MARCH
BY H. W. Brelsford
ATTORNEY

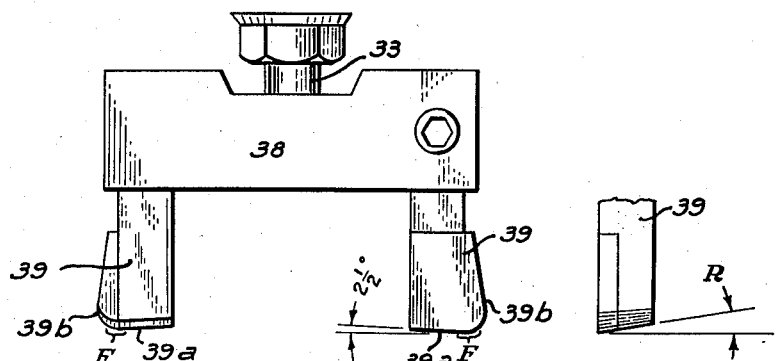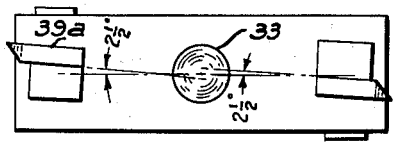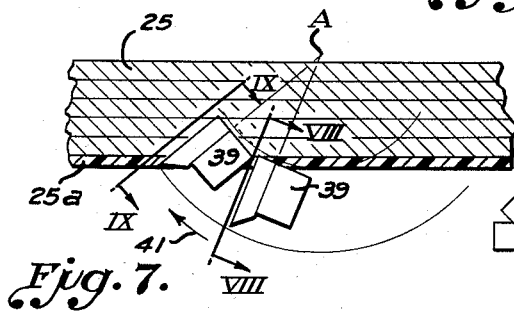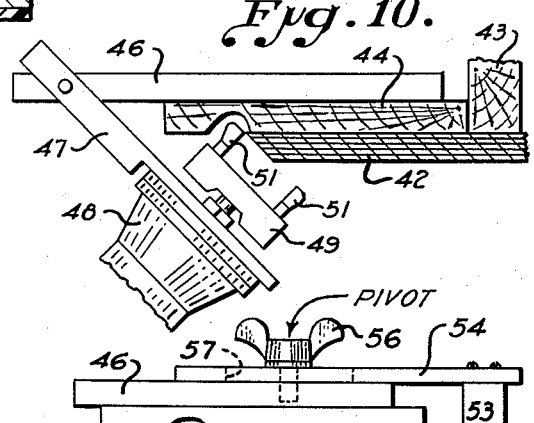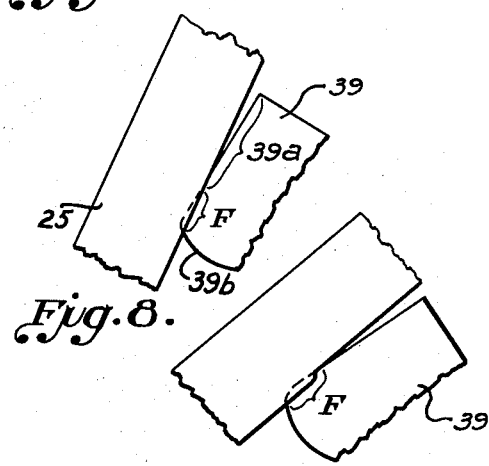

United States Patent Office 2,920,663
Patented Jan. 12, 1960

2,920,663

POWER-OPERATED BEVEL EDGE CUTTER

Raymond M. March, Santa Barbara, Calif., assignor to Knick-March Engineering Inc., Santa Barbara, Calif., a corporation of Missouri Application May 12, 1958, Serial No. 734,768

7 Claims. (Cl. 144—126)

My invention relates to bevel edge cutters for materials used in furniture making and cabinet making and has particular reference to such a cutter that creates a hollow cut of great smoothness and accuracy.

The increasing use of plywood materials surfaced with a plastic sheet has created a demand for fine craftsmanship on mitered edges. Such plastic surfaced plywoods are available in a variety of styles and materials, of which the type sold under the trademark of "Formica" is an example. The plastic material is available in sheet form and is adhered to plywood of the desired kind and thickness. These plastics are generally made from thermosetting plastic and as a consequence are hard and brittle. When cut with ordinary wood working saws the cut edge is badly chipped and is rough due to the breaking and chipping of the hard plastic under the impact of the saw teeth. It is generally necessary to grind such surfaces to obtain a cut edge free of roughness and chipping. Alternatively, such cut edges are often planed by hand planes and the like to develop the necessary smoothness of edge.

Because of the poor appearance of the edges of plywood, mitered edges have become standard for tables, cabinet counters and other horizontal surfaces. While it is generally fairly difficult to get a mitered edge free of small chips and splinters on finished plywood, the problem is even more difficult on plastic surfaced plywood. This is due to the chipping characteristics of the plastic mentioned previously. The various grindings and planings are a time consuming and costly step. Even when expertly done the finished mitered joint often has a hairline crack that is unsightly and which tends to open up.

I have discovered and devised a cutter for beveled or mitered edges of plywood that makes a cut free of splinters and chips. The finished surface is as smooth as can be made with the sharpest plane and is completely devoid of perceptible chips and roughness. The finish miter edges on plastic surfaced plywood is so sharp that cloth is cut easily and workmen brushing against such edges frequently receive long slits in their clothing.

I have discovered means for mounting my cutter so that it will hollow cut the bevel edge. Such hollow cut mitered edges can be closely fitted at both the outside and the inside of the miter joint. This tight fitting is almost impossible with flat mitered edges. Plastic surfaced plywood mitered with my cutter and hollow cut can be so closely fitted together that the external joint is not visible. The external mitered edges are completely smooth, not only to the sense of sight, but to touch as well. No subsequent planing or grinding or other treatment is required for edges cut by my cutter and they may be immediately joined to form the miter joint.

It is a general object of my invention to provide a bevel or miter cutter for furniture and cabinet materials that leaves the edge smooth and free of preceptible chips.

Another object is to provide a method of cutting beveled edges in wood construction materials that produce a finely finished edge.

Still another object is to provide a bevel cutter that hollow cuts a smooth edge on furniture and cabinet materials.

Another object is to provide cutter bits that cut bevel edges on plywood materials free of chips and roughness.

A further object is to provide a bevel or miter cutter for plastic surfaced plywood that leaves a smooth and finished cut edge.

Other objects and advantages of my invention will be apparent in the following description and claims considered together with the accompanying drawings forming an integral part of this specification and in which:

Fig. 4 is an enlarged section view of the tool arm and cutter bits presently preferred for use with the invention.

Fig. 5 is a fragmentary side view of one of the cutter bits of Fig. 4.

Fig. 6 is a bottom view of Fig. 4, illustrating the geometry of the alignment of the tool bits.

Fig. 7 is a schematic diagram looking at right angles toward a beveled edge being cut showing progressive positions of a single tool bit.

Fig. 8 is an enlarged view along the line VIII—VIII.

Fig. 9 is an enlarged view along the line IX—IX.

Fig. 10 is an elevation view of a modified form of the invention wherein the plywood sheet being mitered is stationary and the cutter is moved along the sheet.

Fig. 11 is a fragmentary elevation view of a modified form of the invention which creates a pivot joint so that the cutter may cut on a radius to form curved, mitered edges.

Figure 3:
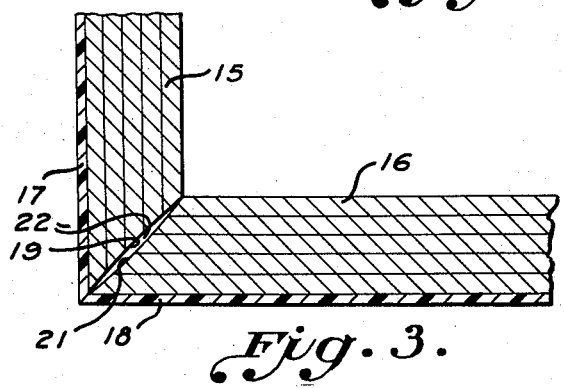
Fig. 3 is a view in full section through a mitered joint made in accordance with the invention formed of plastic surfaced plywood sheets.

Referring to Fig. 3 there is illustrated a mitered joint formed particularly in accordance with the invention. The joint is formed between two sheets of plywood 15 and 16 each having a surface layer of hard plastic 17 and 18 respectively. Each sheet has a mitered or beveled edge 19 and 21 which edges are not straight but are hollow cut particularly in accordance with the invention. The two hollow cut edges define a hollow space 22 which in practice become filled with glue.

The purpose of the hollow cuts 19 and 21 are to permit the outer surfaces 17 and 18 of plastic to be fitted tightly together. Theoretically, two perfectly straight mitered edges can be joined to give a tight joint. In actual practice however, a line exists between the two plastic edges due to the thickness of the glue in the joint, not to mention dust or minor roughness of even a thousandth inch or two that gives rise to hair line separation. The hollow cut is therefore necessary to avoid hair line or other openness of the joint. The two edges of the plywood are pressed together excluding any appreciable amount of glue at the inner and outer surfaces. The glue accordingly collects in the hollow 22 which is exaggerated in size for illustrative purposes. The glue joint is sound and strong but on the accurately cut, straight, smooth and unchipped plastic edges the actual joint cannot be seen, so closely do the pieces join.

Figure 1:
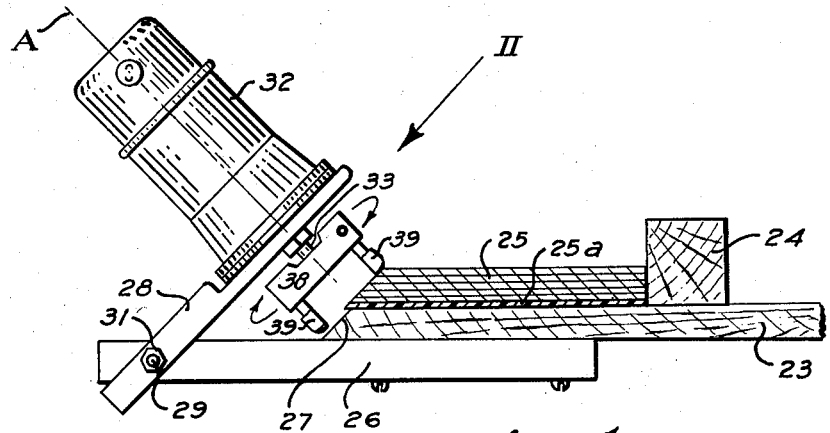
Fig. 1 is an elevation view of a stationary machine made in accordance with the invention through which plywood pieces may be passed for having beveled edges cut on the plywood sheets.
Figure 2:
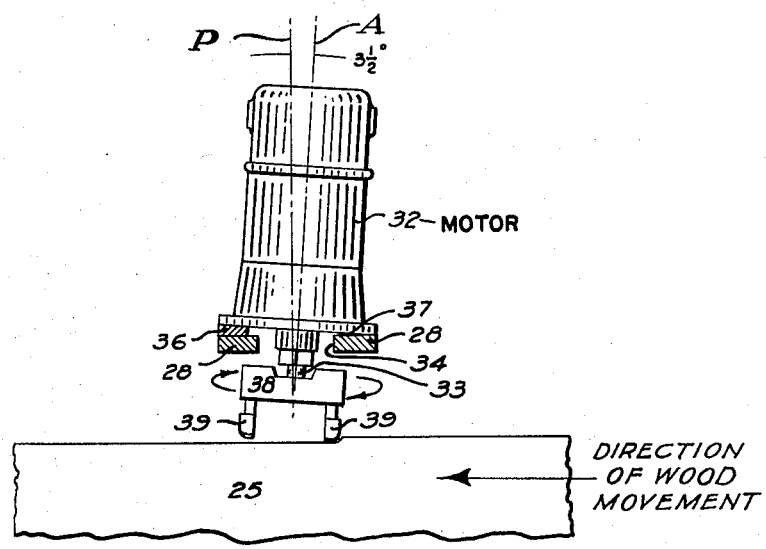
Fig. 2 is a view taken along the direction of the arrow II in Fig. 1 illustrating the tilt of the motor toward the direction of the edge to be cut.

Illustrated in Figs. 1 and 2 is the presently preferred form of the mechanism for accomplishing the mitered joint of Fig. 3. Those two figures illustrate a fixed bench type of machine through which, or over which, sheet materials may be passed for cutting the bevel edge. A stationary table top 23 has an adjustable work guide 24 mounted thereon. A work piece 25 may be a plastic surfaced plywood sheet having an edge to be mitered. Secured to the underside of the table top 23 is a wide bar 26 preferably of metal, and this bar projects past the edge 27 of the table 23. Pivoted to the outer end of bar 26 is a yoke 28 and the pivot joint is formed by a bolt 29 passing through both yoke and bar. A nut 31 may be tightened to secure the yoke at any selected angle. The illustrated angle is 45° for forming right angle or 90° miter joints. Various other angles could be selected.

Mounted on the yoke 28 is a high speed electric motor 32 having a projecting motor shaft 33. The yoke is apertured at 34 to permit the shaft 33 to pass therethrough. Illustrated particularly in Fig. 2 is a presently preferred construction for tilting the motor in a plane through the motor axis and along the edge to be mitered. This consists of shims 36 and 37 that cock the motor toward the right in Fig. 2. Shim 36 is thicker than shim 37 causing the motor to tilt toward the edge of the plywood 25 to be mitered.

The motor shaft axis of rotation is designated by the letter A in Fig. 2 and a plane at right angles to the finished bevel edge and transverse to that edge is designated by the letter P. The preferred angle between axis A and plane P is 2½ to 3½° and 5° is probably an upper limit is good work although greater hollow cuts could be tolerated, perhaps up to 10°. The tilt of axis A accordingly is toward the edge of plywood to be cut, and the tilt is in a plane through the axis at right angles to the bevel edge but extending along the edge to be beveled.

The shaft 33 has a tool arm 38 secured to it in which are mounted two cutter bits 39, preferably identical. The bits have cutting edges not only on the outer edges of the bits, but principally along a line generally radial to the axis A of the shaft 33. The path of motion of this cutting edge defines a disk disposed at a slight angle to the bevel edge, and this disk can be thought of as moving along the edge to be beveled, and scooping out or chiseling out the hollow cuts of Fig. 3.

The tilt angle between lines A and P (Fig. 2) not only gives rise to the hollow cut, but has the further advantage of eliminating back drag cutter marks. For example on edges cut with a circular saw, not only are there marks of the saw teeth as they cut, but the teeth drag on the back stroke or non-cutting stroke, giving rise to double roughness. This is eliminated in the present invention by the axis tilt.

Illustrated in Figs. 4, 5, and 6 is the presently preferred geometry of the tool bits. The tool arm 38 may be secured to the shaft 33 in any suitable manner and the tool arm 38 may be apertured at its ends to receive the tool bits 39. The generally radial cutting edges are referred to by the numeral 39a, and the outer cutting edges by 39b. The rough cutting is done by the outer edge 39b, and the generally radial edge does very little cutting and is generally a defuzzing and cooling edge. The finish cutting of the hard plastic is confined to a relatively short length of cutting edge disposed between the two cutting edges and designated in Fig. 4 by the letter F as will be described in more detail with reference to Figs. 7, 8 and 9. This finish cutting of the plastic takes place with a slicing action rather than with the chisel cut type of action of a saw tooth.

Illustrated in Fig. 4 is the rake angle R which may be in any conventional rake angle for example 7°.

Illustrated in Fig. 6 is a peculiarity of the cutting edge of geometry which has proved to be very important in actual practice. The cutting edges 39a are not truly radial to the axis of the shaft 33 but are canted at a slight angle to true radial, for example 2½ to 5°. I cannot explain the reason for the improved performance of such an angle on the cutting face, but it does practically eliminate the chatter and vibration of the cutting bit.

Illustrated in Figs. 7, 8, and 9 is the cutting action for the finish cut on the plastic edge of the cut. There it will be noted that the shaft axis A is disposed out of line with the plastic edge 25a of the work piece 25. As mentioned previously, Fig. 7 is a view looking at right angles to the finished beveled edge on the work piece 25 and the tool bits 39 illustrated are merely different positions of the same tool bit moving in the direction of the arrow 41. It will be noted particularly in Fig. 7 that the cutting edges of the tool bit 39 strike the plastic layer 25a at an appreciable angle so that the contact of the cutting edge is progressive along the outer surface of the plastic.

Not only is the contact with the plastic surface progressive along its length, but the depth of the cut is progressive. As shown in Fig. 8 the first contact of the cutting edge is microscopically thin. As the cutter bit advances to the position shown in Fig. 9 the cut is deeper. The action therefore is similar to that of a very slightly angled plane and there is no chisel-like striking of the plastic that would cause it to be chipped.

It has further been discovered that there is a practical necessity for the direction of the cutting to come from outside of the outer surface of the plastic 25a toward the body of the plastic and its backing plywood. If the cutting stroke is in the opposite direction, chipping invariably results.

As mentioned previously, the cutting edge portion F cuts the finish cut of the plastic. It has been discovered that the wood fibers do not receive a finish cut from this portion of the cutting edge and there would be a microscopic wood fuzz left if this cutting edge F only were used. The generally radial cutting edge 39a accordingly serves the function of cutting off this fuzz as well as serving a general cooling action for the cutting edge F. This defuzzing and cooling edge portion 39a may be truly transverse to the shaft axis or it may be inclined away from the work piece by a slight angle such as the angle 2½° illustrated in Fig. 4. The cutting edge 39a, however, does not operate best if it is inclined at a slight angle toward the work piece.

I have further found that speed of rotation is important is obtaining a perfectly smooth, mitered edge. I employ a 20,000 r.p.m. motor and a distance between the outer tool faces of 2½ to 3 inches. These motors slow down substantially under load. I have determined that a lineal speed of the tool bit from 9,000 to 15,000 feet per minute should be used and that the lower practical limit is 6,000 feet per minute, but this is not very efficient.

Illustrated in Fig. 10 is a modified form of the invention wherein a work piece 42 is stationary and a guide 43 is held thereon by clamps or any other suitable mechanism. A board 44 on which is mounted a bar 46 and a pivoted yoke 47 may be slid along the surface of the work piece 42. The yoke may carry a motor 48 and a cutter arm 49 with cutter bits 51. This type of movable machine is to be preferred for large work pieces such as counter tops which are too large to conveniently feed through a stationary bevel cutter.

Illustrated in Fig. 11 is a mechanism for cutting bevel edges around a circular path. A work piece 52 may have a block 53 secured thereto and a pivot arm 54 is secured to the block 53. A thumb screw 56 may pass through a slot 57 in the bar 54 to engage the support bar 46. The support bar 46 may rotate about the thumb screw and in this manner the associated bevel cutter as illustrated in Fig. 10 may be rotated along a circular path to cut a circular bevel to thereby form a circular miter joint.

The mode of operation of the invention has been described with respect to the mechanical structure of the different views.

While the invention has been described with reference to particular embodiments thereof, it is not limited to these embodiments but includes all modifications and variations that fall within the true spirit and scope of the invention.

I claim:

1. A cutter for beveled edges on non-metal materials having a first plane normal to and transverse to the bevel edge and a second plane normal to and parallel to the bevel edge comprising: a rotatable shaft having an axis of rotation; a motor for driving said shaft; a tool bit spaced from the shaft axis and secured to the shaft and having a cutting surface transverse to the shaft axis and a cutting surface on the outer side away from the shaft; and means for mounting the shaft to dispose said axis parallel to the second plane and at a slight angle with respect to the 1st plane.

2. The cutter of claim 1 in which an elongated guide is provided parallel to the edge to be bevelled for moving the cutter and material relative to each other along the bevel edge.

3. The cutter of claim 1 in which the slight angle is not more than 5°.

4. The method of cutting a mitered edge on plastic surfaced plywood comprising: moving a cutter bit that has a cutting edge along a circular path at a speed of not less than 6,000 feet per minute; disposing the axis of rotation of the circular path at approximately right angles to the mitered edge; and disposing the cutting edge with respect to the bevel edge so that a slicing action takes place; and positioning the plastic surface of the plywood with respect to the direction of the bit travel so that the bit first strikes the outer surface of the plastic surface.

5. The method of using a rotary cutter for producing a hollow ground mitered edge on sheet materials for furniture comprising: disposing the axis of rotation of the cutter generally normal to, but slightly inclined toward one end of the sheet to be mitered; and slowly moving the cutter and the sheet material with respect to each other along said one edge, so that the cutter path defines a disk at a slight angle to the mitered edge that effectively scoops out a hollow cut.

6. A cutter for beveling the edges of plastic surfaced wood sheets comprising: a rotatable shaft having an axis of rotation; a motor for driving said shaft; a tool bit secured to and spaced from the shaft axis by a distance approximately not less than the thickness of the wood sheet; a cutting edge on the tool bit approximately radial to and normal to the shaft axis; means for moving the cutter along the wood sheet edge to be beveled; means for holding the shaft axis normal to the beveled edge except that it inclines slightly toward the direction of movement; and means for positioning the shaft axis so that the tool bit clears the projection of the sheet surface having the plastic surface, the direction of shaft rotation driving the bit from outside of the plastic surface toward the plastic surface, and the radial cutting edge engaging the plastic surface progressively.

7. The tool bit of claim 1 wherein the radial cutting edge is slightly inclined toward the work piece and a smooth curve connects the radial and outer side cutting edges and forms the finish cutting edge of the bit.

References Cited in the file of this patent

UNITED STATES PATENTS

| | | |
|---|---|---|
| 1,000,526 | Lammel | Aug. 15, 1911 |
| 1,663,225 | Widman | Mar. 20, 1928 |
| 2,053,382 | Stickley | Sept. 8, 1936 |
| 2,581,818 | Somerset | Jan. 8, 1952 |
| 2,785,713 | Wagner | Mar. 19, 1957 |
| 2,802,498 | Robinson | Aug. 13, 1957 |
| 2,823,713 | Goldsmith | Feb. 18, 1958 |